(12) United States Patent
Choudhari et al.

(10) Patent No.: US 11,589,094 B2
(45) Date of Patent: Feb. 21, 2023

(54) SYSTEM AND METHOD FOR RECOMMENDING MEDIA CONTENT BASED ON ACTUAL VIEWERS

(71) Applicant: AT&T Intellectual Property I, L.P., Atlanta, GA (US)

(72) Inventors: Ashish Choudhari, Alpharetta, GA (US); Daniel Connolly, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/518,079

(22) Filed: Jul. 22, 2019

(65) Prior Publication Data

US 2021/0029391 A1 Jan. 28, 2021

(51) Int. Cl.
*H04N 21/25* (2011.01)
*H04N 21/2668* (2011.01)
*H04N 21/258* (2011.01)
*H04N 21/442* (2011.01)
*H04N 21/466* (2011.01)

(52) U.S. Cl.
CPC ..... *H04N 21/252* (2013.01); *H04N 21/25883* (2013.01); *H04N 21/25891* (2013.01); *H04N 21/2668* (2013.01); *H04N 21/44218* (2013.01); *H04N 21/44222* (2013.01); *H04N 21/4667* (2013.01); *H04N 21/4668* (2013.01)

(58) Field of Classification Search
None
See application file for complete search history.

(56) References Cited

U.S. PATENT DOCUMENTS

| | | | |
|---|---|---|---|
| 7,698,236 B2 | 4/2010 | Cox et al. | |
| 7,739,280 B2 | 6/2010 | Aravamudan et al. | |
| 7,890,513 B2 | 2/2011 | Plastina et al. | |
| 7,904,924 B1 | 3/2011 | de Heer et al. | |
| 7,937,725 B1 * | 5/2011 | Schaffer | H04N 21/4755 725/47 |
| 8,463,295 B1 | 6/2013 | Caralis et al. | |
| 8,660,895 B1 * | 2/2014 | Saurabh | G06Q 30/0204 705/14.42 |
| 8,694,495 B2 * | 4/2014 | Saito | G06F 16/284 707/732 |

(Continued)

FOREIGN PATENT DOCUMENTS

KR 100876300 B1 12/2008

*Primary Examiner* — An Son P Huynh
(74) *Attorney, Agent, or Firm* — Guntin & Gust, PLC; Robert Gingher

(57) ABSTRACT

Aspects of the subject disclosure may include, for example, a device, that has a processing system including a processor; and a memory that stores executable instructions that, when executed by the processing system, facilitate performance of operations, where the operations include detecting each individual of an audience viewing media content on user equipment; retrieving a user profile for each individual of the audience resulting in user profiles; creating a group profile from the user profiles; determining, based on the group profile, a recommendation for viewing a candidate media content; and providing the recommendation to the user equipment for the audience. Other embodiments are disclosed.

20 Claims, 13 Drawing Sheets

(56) References Cited

U.S. PATENT DOCUMENTS

| | | | | |
|---|---|---|---|---|
| 8,823,793 B2* | 9/2014 | Clayton | | G06F 21/554 348/154 |
| 9,014,546 B2* | 4/2015 | Shimy | | H04N 21/4826 386/296 |
| 9,026,476 B2 | 5/2015 | Bist | | |
| 9,106,958 B2 | 8/2015 | El Kaliouby et al. | | |
| 9,137,558 B2* | 9/2015 | Gibbon | | H04H 60/45 |
| 9,230,212 B2 | 1/2016 | Su | | |
| 9,344,765 B2 | 5/2016 | Diaz Perez | | |
| 9,967,618 B2* | 5/2018 | Blong | | H04L 51/32 |
| 10,187,694 B2* | 1/2019 | Meredith | | H04H 60/33 |
| 10,205,988 B1* | 2/2019 | Waterman | | H04N 21/4751 |
| 10,257,572 B2* | 4/2019 | Manus | | H04N 21/812 |
| 10,298,706 B2 | 5/2019 | Edwards et al. | | |
| 10,341,723 B2* | 7/2019 | Benedetto | | H04N 21/42201 |
| 10,387,173 B1* | 8/2019 | Paulus | | G06Q 40/125 |
| 10,387,795 B1* | 8/2019 | Oldridge | | G06N 5/04 |
| 10,535,190 B2* | 1/2020 | Logan | | G06T 13/40 |
| 10,798,451 B2* | 10/2020 | Wilkinson | | H04N 21/44218 |
| 10,873,601 B1* | 12/2020 | Stickle | | H04L 63/1416 |
| 10,979,778 B2* | 4/2021 | Matthews | | H04N 21/25883 |
| 11,146,843 B2* | 10/2021 | Natesan | | G06N 20/00 |
| 2005/0289582 A1* | 12/2005 | Tavares | | H04H 60/33 725/10 |
| 2007/0028266 A1 | 2/2007 | Trajkovic et al. | | |
| 2007/0136753 A1* | 6/2007 | Bovenschulte | | H04N 21/44224 348/E7.071 |
| 2007/0174862 A1* | 7/2007 | Kushida | | H04N 21/44222 725/15 |
| 2008/0092156 A1* | 4/2008 | Ferrone | | H04N 21/44218 725/13 |
| 2009/0027337 A1* | 1/2009 | Hildreth | | G06F 3/04842 345/158 |
| 2009/0131764 A1* | 5/2009 | Lee | | H04N 21/42201 600/301 |
| 2009/0133051 A1* | 5/2009 | Hildreth | | H04N 21/4223 725/28 |
| 2009/0138805 A1* | 5/2009 | Hildreth | | H04N 21/4223 715/745 |
| 2009/0144225 A1* | 6/2009 | Saito | | G06F 16/434 |
| 2010/0153885 A1* | 6/2010 | Yates | | H04N 21/4532 715/841 |
| 2010/0194762 A1* | 8/2010 | Latta | | G06F 3/017 345/473 |
| 2010/0199230 A1* | 8/2010 | Latta | | G06F 3/011 715/863 |
| 2010/0207874 A1* | 8/2010 | Yuxin | | G09F 27/00 345/156 |
| 2010/0211439 A1* | 8/2010 | Marci | | H04N 21/4532 705/7.29 |
| 2010/0251295 A1* | 9/2010 | Amento | | H04N 21/475 725/38 |
| 2010/0261617 A1* | 10/2010 | Poustka | | C12Q 1/6886 435/7.1 |
| 2010/0303289 A1* | 12/2010 | Polzin | | A63F 13/428 382/103 |
| 2010/0306713 A1* | 12/2010 | Geisner | | G06F 3/04847 715/863 |
| 2010/0321389 A1* | 12/2010 | Gay | | G06T 15/00 345/427 |
| 2011/0069940 A1* | 3/2011 | Shimy | | H04N 21/44218 386/296 |
| 2011/0150271 A1* | 6/2011 | Lee | | G06T 7/215 382/103 |
| 2011/0173662 A1* | 7/2011 | Beppu | | H04N 21/44218 725/46 |
| 2011/0190055 A1* | 8/2011 | Leyvand | | A63F 13/428 463/36 |
| 2012/0030637 A1* | 2/2012 | Dey | | G06F 3/0304 715/863 |
| 2012/0060176 A1* | 3/2012 | Chai | | H04N 21/44218 725/10 |
| 2012/0072420 A1* | 3/2012 | Moganti | | G06F 16/748 707/737 |
| 2012/0124604 A1* | 5/2012 | Small | | H04N 21/4223 725/12 |
| 2012/0154557 A1* | 6/2012 | Perez | | H04N 21/47205 348/53 |
| 2012/0278179 A1* | 11/2012 | Campbell | | G06Q 30/0255 705/14.69 |
| 2013/0016910 A1* | 1/2013 | Murata | | H04N 21/8583 382/195 |
| 2013/0076853 A1* | 3/2013 | Diao | | H04N 7/157 348/14.08 |
| 2013/0194177 A1* | 8/2013 | Sakata | | H04N 21/44218 345/156 |
| 2013/0205314 A1* | 8/2013 | Ramaswamy | | H04N 21/44218 725/14 |
| 2013/0232515 A1* | 9/2013 | Rivera | | G06Q 30/02 725/12 |
| 2014/0067828 A1* | 3/2014 | Archibong | | G06F 17/30277 707/748 |
| 2014/0068692 A1* | 3/2014 | Archibong | | H04N 21/23424 725/116 |
| 2014/0078039 A1* | 3/2014 | Woods | | H04N 21/442 345/156 |
| 2014/0089017 A1* | 3/2014 | Klappert | | G06Q 10/02 705/5 |
| 2014/0150002 A1* | 5/2014 | Hough | | H04N 21/2668 725/9 |
| 2014/0168056 A1* | 6/2014 | Swaminathan | | G06F 3/147 345/156 |
| 2014/0195918 A1* | 7/2014 | Friedlander | | G06F 3/0485 715/727 |
| 2014/0280550 A1* | 9/2014 | Glass | | H04L 67/306 709/204 |
| 2014/0363059 A1* | 12/2014 | Hurewitz | | G06Q 30/0201 382/118 |
| 2014/0373046 A1* | 12/2014 | Franji | | H04N 21/25891 725/34 |
| 2015/0029087 A1* | 1/2015 | Klappert | | G06F 3/015 345/156 |
| 2015/0033245 A1* | 1/2015 | Klappert | | H04N 21/4334 725/12 |
| 2015/0033258 A1* | 1/2015 | Klappert | | H04N 21/4316 725/38 |
| 2015/0033259 A1* | 1/2015 | Klappert | | A61B 5/398 725/39 |
| 2015/0033262 A1* | 1/2015 | Klappert | | H04N 21/44218 725/43 |
| 2015/0033266 A1* | 1/2015 | Klappert | | H04N 21/4334 725/52 |
| 2015/0070516 A1* | 3/2015 | Shoemake | | H04N 21/4542 348/207.11 |
| 2015/0110471 A1* | 4/2015 | Zheng | | H04N 1/00336 386/291 |
| 2015/0128158 A1* | 5/2015 | Wheatley | | H04N 21/44218 725/12 |
| 2015/0172775 A1* | 6/2015 | Yee | | H04N 21/4728 725/37 |
| 2015/0178511 A1* | 6/2015 | Klappert | | G06F 21/6245 726/27 |
| 2015/0181291 A1* | 6/2015 | Wheatley | | H04N 21/84 725/10 |
| 2015/0256633 A1* | 9/2015 | Chand | | G06Q 50/01 382/103 |
| 2016/0021412 A1* | 1/2016 | Zito, Jr. | | H04N 21/488 725/13 |
| 2016/0057497 A1* | 2/2016 | Kim | | H04N 21/4415 725/10 |
| 2016/0094875 A1* | 3/2016 | Peterson | | H04N 21/47217 725/41 |
| 2016/0345062 A1* | 11/2016 | Klappert | | H04N 21/4383 |
| 2016/0366203 A1* | 12/2016 | Blong | | H04L 51/32 |
| 2017/0006322 A1* | 1/2017 | Dury | | A63F 13/49 |
| 2017/0060368 A1* | 3/2017 | Kochura | | G06F 9/451 |
| 2017/0061528 A1* | 3/2017 | Arora | | G06F 16/951 |
| 2017/0083831 A1* | 3/2017 | Ghosh | | G06Q 10/06 |

(56) References Cited

U.S. PATENT DOCUMENTS

| | | | |
|---|---|---|---|
| 2017/0149795 A1* | 5/2017 | Day, II | H04L 63/108 |
| 2017/0264920 A1* | 9/2017 | Mickelsen | H04N 21/44008 |
| 2017/0337250 A1* | 11/2017 | Li | G06Q 10/101 |
| 2017/0366867 A1* | 12/2017 | Davies | H04N 21/4882 |
| 2018/0005116 A1* | 1/2018 | Pickover | G06Q 50/01 |
| 2018/0007148 A1* | 1/2018 | Nielsen | H04L 67/306 |
| 2018/0012237 A1* | 1/2018 | Krasikov | G06Q 50/01 |
| 2018/0081432 A1* | 3/2018 | Chen | G06F 16/9535 |
| 2018/0144256 A1* | 5/2018 | Saxena | G06N 20/00 |
| 2018/0152760 A1* | 5/2018 | Venetucci | H04H 20/00 |
| 2018/0164876 A1* | 6/2018 | Smit | G06F 3/04815 |
| 2018/0285770 A1* | 10/2018 | Manikonda | G06N 20/00 |
| 2019/0073520 A1* | 3/2019 | Ayyar | G06V 20/41 |
| 2019/0075359 A1* | 3/2019 | Boss | H04L 67/306 |
| 2019/0109926 A1* | 4/2019 | Hotchkies | H04L 67/63 |
| 2019/0166070 A1* | 5/2019 | Dey | G06K 9/00228 |
| 2019/0191203 A1* | 6/2019 | Asbun | H04N 21/25891 |
| 2019/0251966 A1* | 8/2019 | Dharne | G06N 5/02 |
| 2019/0253743 A1* | 8/2019 | Tanaka | H04N 21/21805 |
| 2019/0318491 A1* | 10/2019 | Laganiere | G06K 9/00369 |
| 2019/0332963 A1* | 10/2019 | Wong | G06N 7/005 |
| 2020/0078688 A1* | 3/2020 | Kaethler | A63F 13/335 |
| 2020/0117858 A1* | 4/2020 | Freeman | G06F 40/30 |
| 2020/0142999 A1* | 5/2020 | Pedersen | G06K 9/6263 |
| 2020/0288204 A1* | 9/2020 | Duersch | G06N 20/00 |
| 2020/0327559 A1* | 10/2020 | Sharma | H04L 63/10 |
| 2020/0394265 A1* | 12/2020 | Ray | G06F 40/205 |
| 2021/0073264 A1* | 3/2021 | Vaughn | G06F 16/483 |

* cited by examiner

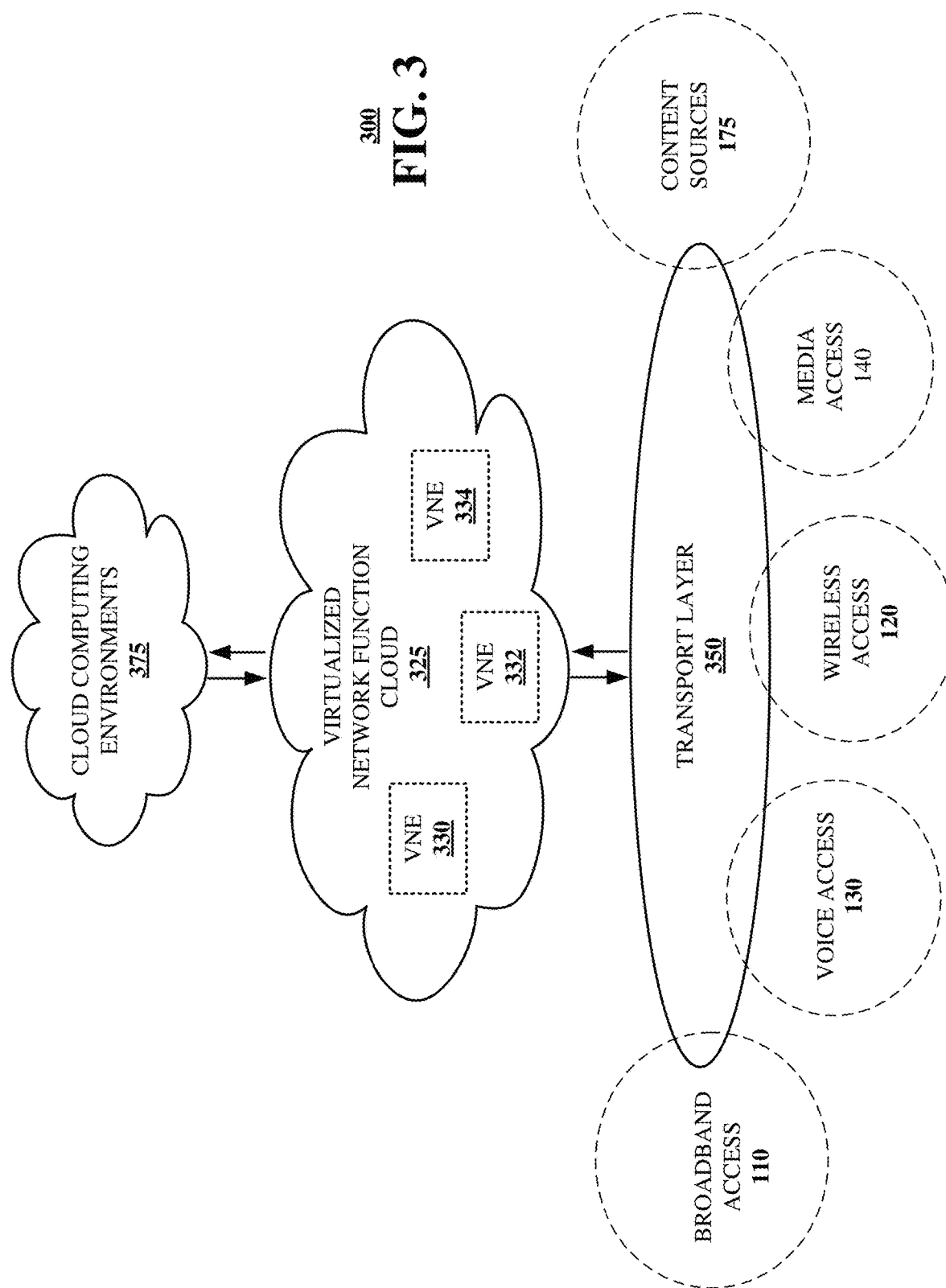

US 11,589,094 B2

1

SYSTEM AND METHOD FOR RECOMMENDING MEDIA CONTENT BASED ON ACTUAL VIEWERS

FIELD OF THE DISCLOSURE

The subject disclosure relates to a system and method for recommending media content based on identities of actual viewers.

BACKGROUND

People often watch the media contents together. Systems and methods have been used to recommend and rate programs that identify a viewer. System and methods have also been established for providing recommendations to an individual viewer.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein;

2

Figure 4:
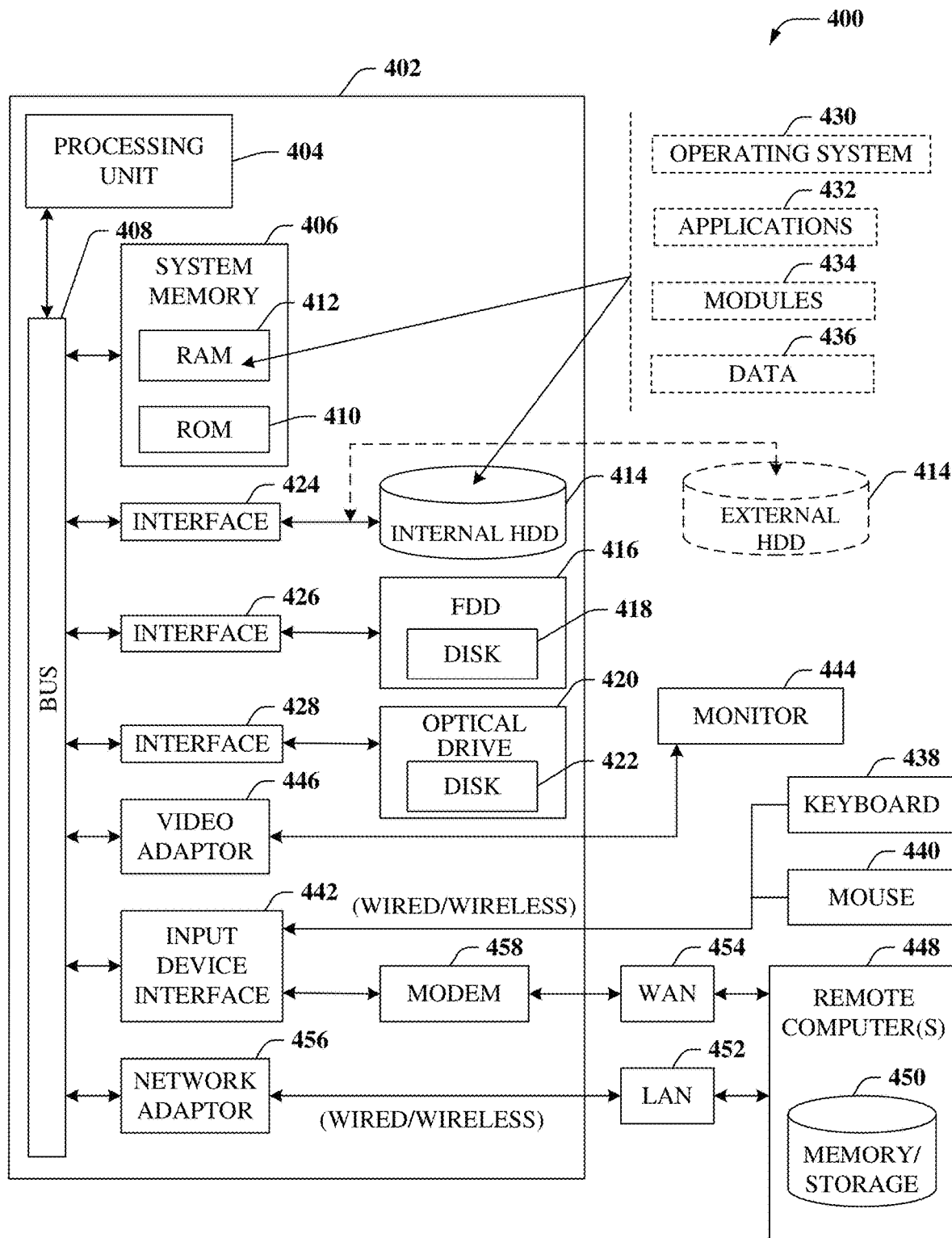
Figure 5:
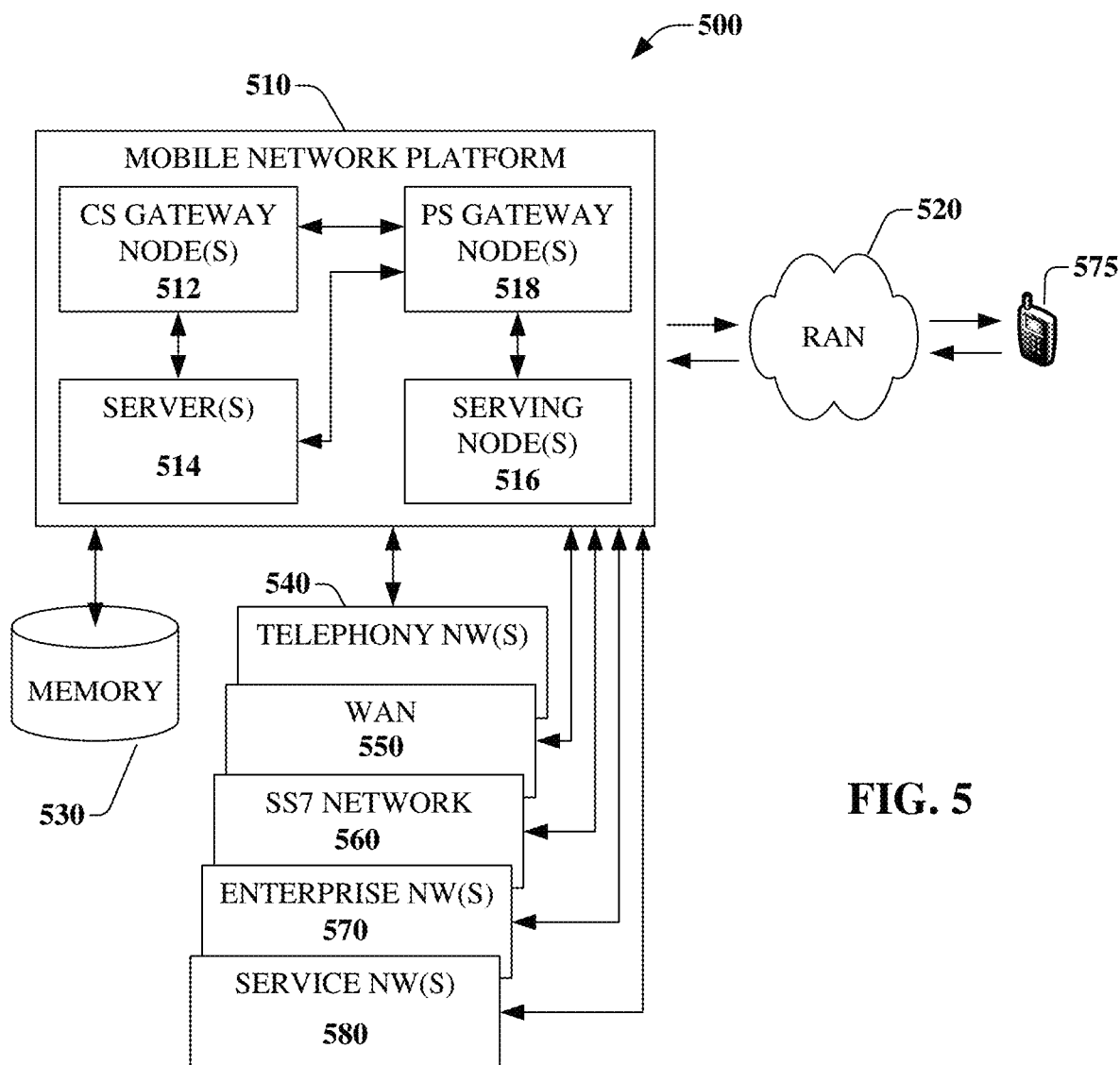
Figure 6:
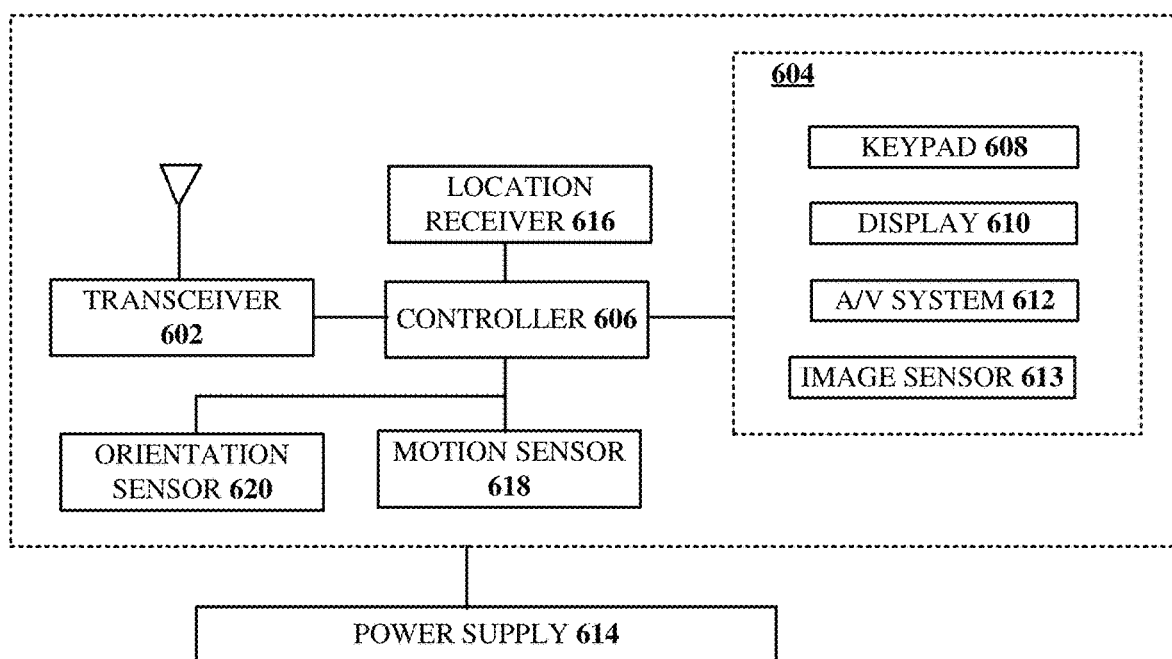

FIG. 4 is a block diagram of an example, non-limiting embodiment of a computing environment in accordance with various aspects described herein;

FIG. 5 is a block diagram of an example, non-limiting embodiment of a mobile network platform in accordance with various aspects described herein; and FIG. 6 is a block diagram of an example, non-limiting embodiment of a communication device in accordance with various aspects described herein.

DETAILED DESCRIPTION

The subject disclosure describes, among other things, illustrative embodiments for a system and method for creating media content recommendations for an audience of two or more viewers. Other embodiments are described in the subject disclosure.

One or more aspects of the subject disclosure include a device, that has a processing system including a processor; and a memory that stores executable instructions that, when executed by the processing system, facilitate performance of operations, where the operations include detecting each individual of an audience viewing media content on user equipment; retrieving a user profile for each individual of the audience resulting in user profiles; creating a group profile from the user profiles; determining, based on the group profile, a recommendation for viewing a candidate media content; and providing the recommendation to the user equipment for the audience.

One or more aspects of the subject disclosure include a machine-readable medium, comprising executable instructions that, when executed by a processing system including a processor, facilitate performance of operations, where the operations include capturing an image including each individual viewer of an audience viewing media content on equipment; identifying one or more key attributes for each individual viewer from the image, resulting in key attributes of the audience; creating a profile for the audience based on the key attributes of the audience; determining, based on the profile, a recommendation for viewing a candidate media content; and providing the recommendation to the equipment.

One or more aspects of the subject disclosure include a method of capturing, by a processing system including a processor, an image including each individual viewer of an audience viewing media content on user equipment; identifying, by the processing system, one or more key attributes for each individual viewer from the image, resulting in group attributes; creating, by the processing system, a group profile from the group attributes; determining, by the processing system based on the group profile, a recommendation for viewing a candidate media content; and providing, by the processing system, the recommendation to the user equipment for the audience.

Figure 1:
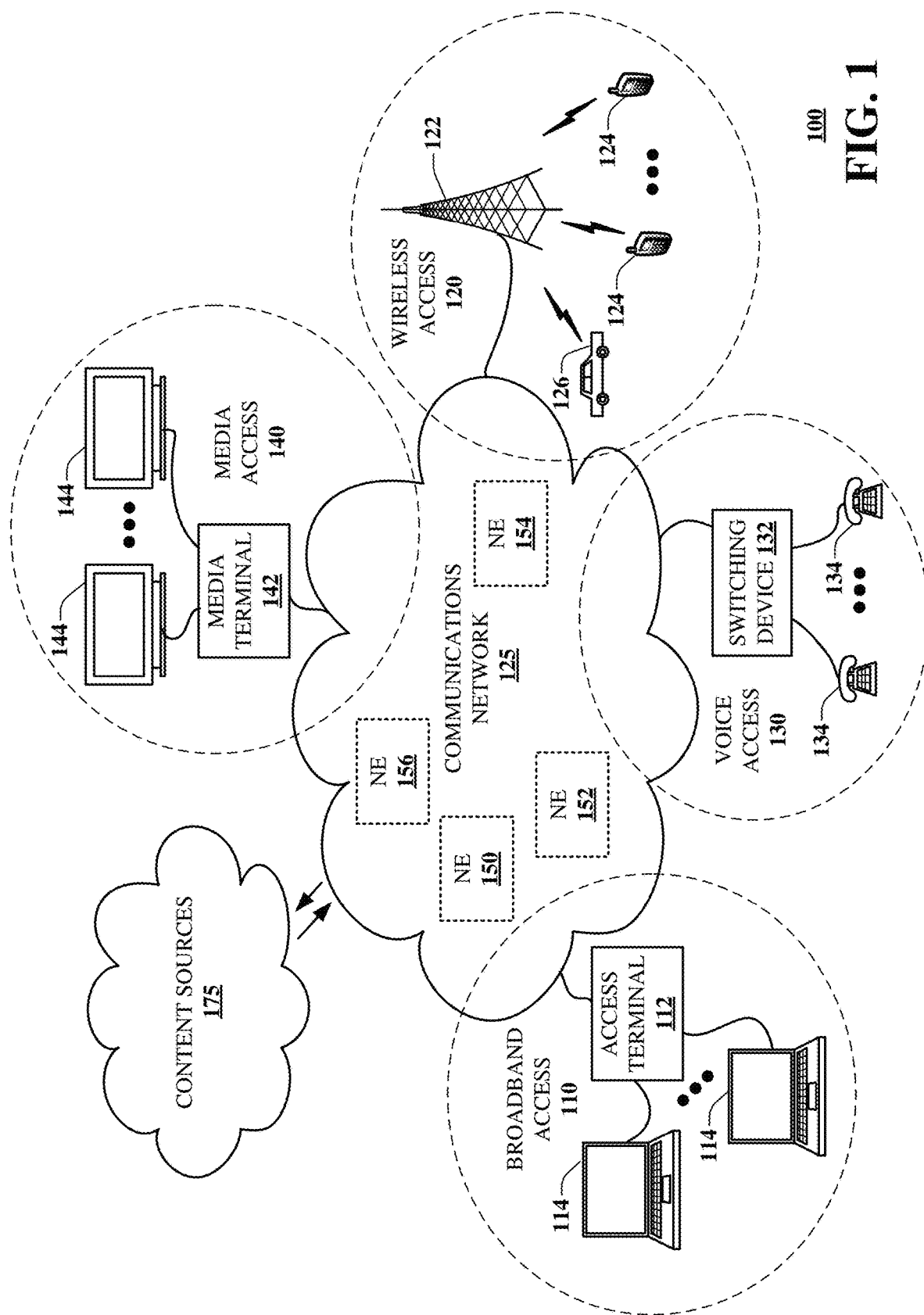
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part a network service provider (NSP) or Internet service provider (ISP) network described below. Communications network 100 can provide a conduit for information to be exchanged between a user device at an audience location and a system for recommending media content, as described below. The communications network 100 can forward recommendations generated by the system to the user device, and provide media content to the user device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
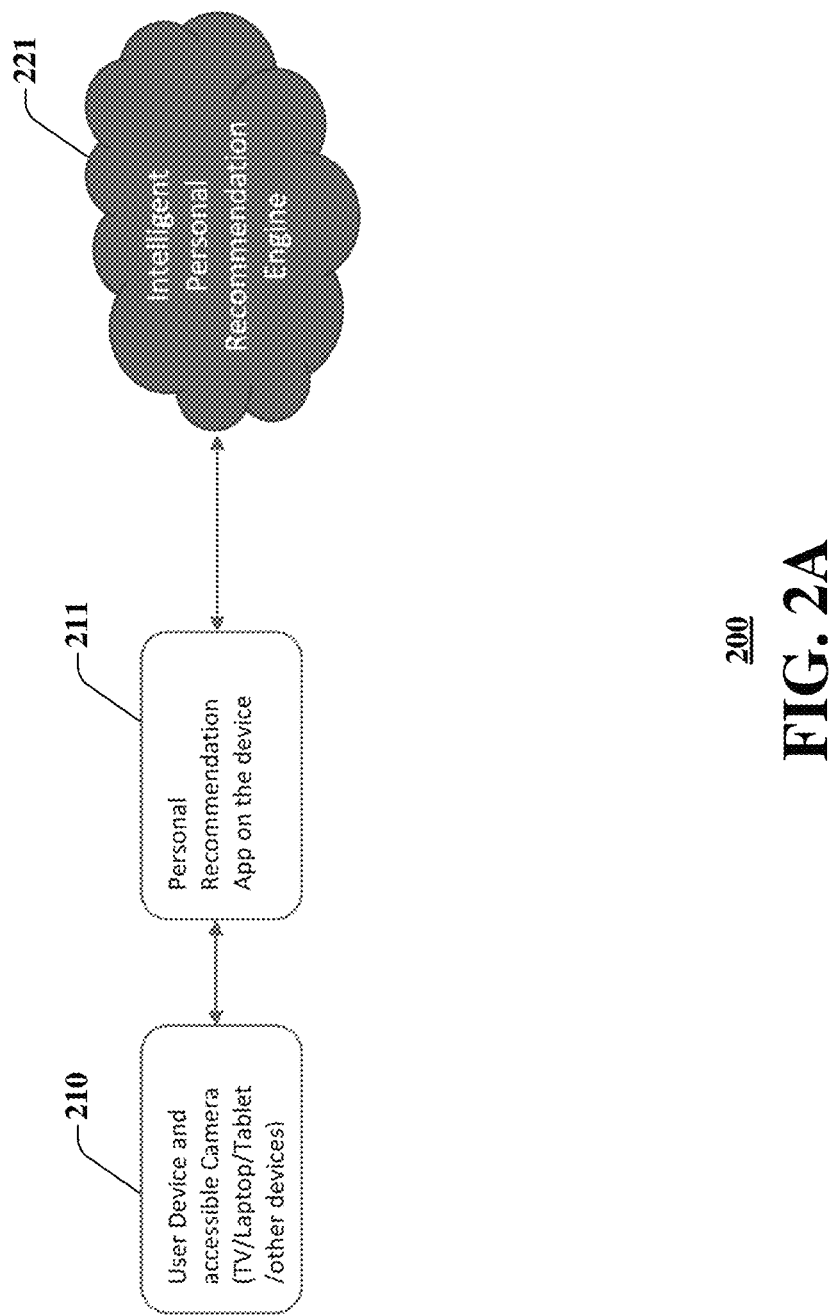
FIG. 2A is a block diagram illustrating an example, non-limiting embodiment of a system for recommending media content based on actual viewers functioning within the communication network of FIG. 1 in accordance with various aspects described herein.

FIG. 2A is a block diagram illustrating an example, non-limiting embodiment of a system for recommending media content based on actual viewers functioning within the communication network of FIG. 1 in accordance with various aspects described herein. People often watch media content together. The combination of the individuals who are watching the media content is usually not known in advance. A recommendation for a candidate media content for that combination of the viewers can be generated by a system that has information identifying the individual viewer. Further, the recommendation can be enriched using traits of each individual viewer that can change frequently, such as emotions, clothing, position of the viewers, or reactions to the media content. Characteristics/traits, emotions, body position and other characteristics of the individual viewers can be used with location information (e.g., home, vacation rental, hotel, etc.) to generate a recommendation for media content.

As shown in FIG. 2A, system 200 has three major components: a customer or user device 210 with an accessible camera, a personal recommendation application, referred to as App 211, which resides on the customer premise or equipment, and Intelligent Personal Recommendation engine 221. App 211 on the device performs image processing to extract generic key features (e.g. Height, Age, Gender etc.) from the images of the viewers captured by user device 210. App 211 also determines emotions (smile, happy, etc.) and body position of the users (lie down, sitting, etc.).

The Intelligent Personal Recommendation engine 221 uses these generic keys features to identify profile(s) of the viewers, provide recommendations, and collect selections/reactions of the viewers.

Figure 2B:
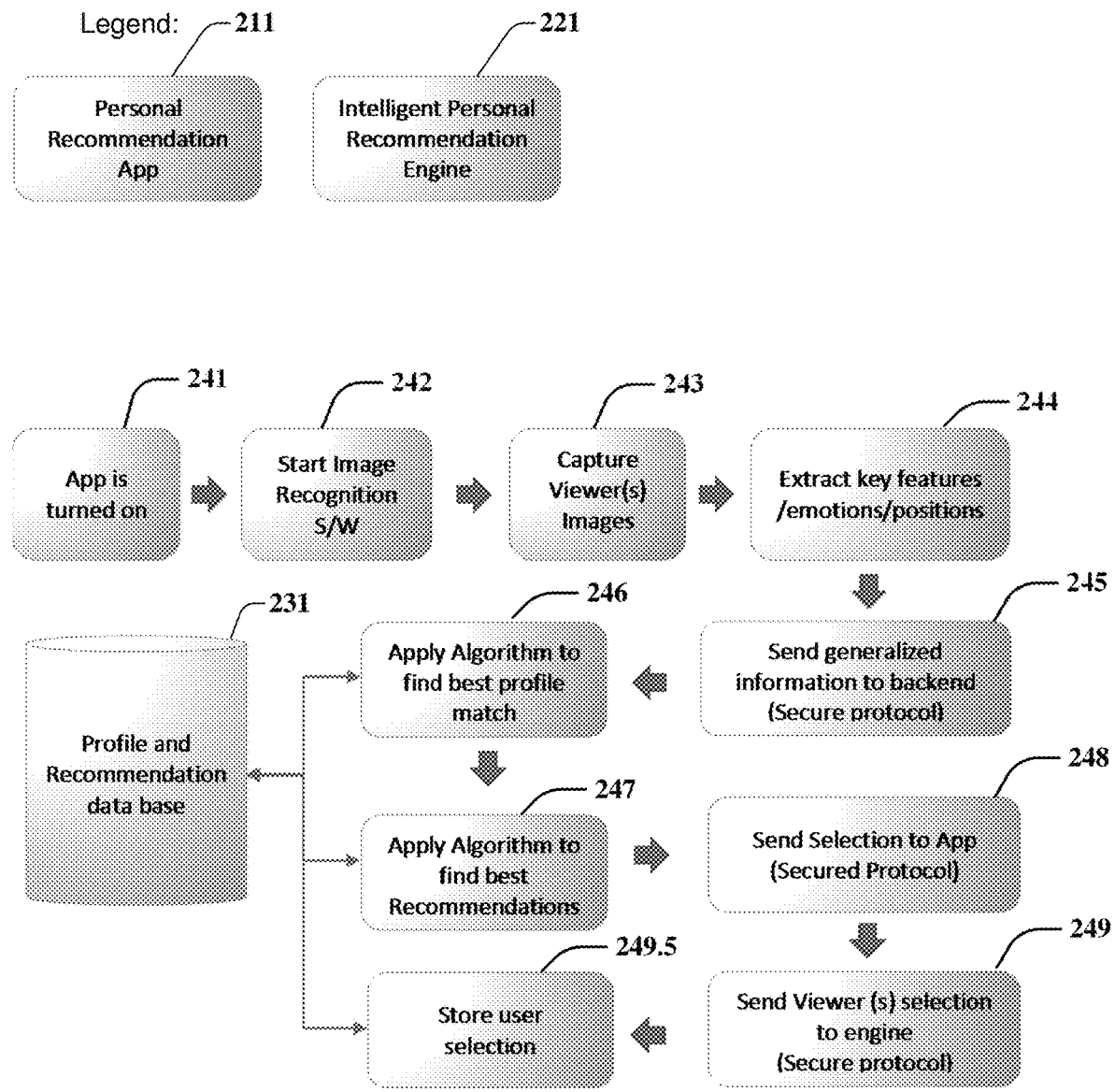
FIG. 2B depicts an illustrative embodiment of a method for providing a media content recommendation in accordance with various aspects described herein.

FIG. 2B depicts an illustrative embodiment of a method for providing a media content recommendation in accordance with various aspects described herein. FIG. 2B is a functional flow diagram that captures key high-level functionalities of the components, interaction and information exchange between the components. As shown in FIG. 2B, the method begins with step 241 where a user of system 200 may turn on the personal recommendation App 211, or the App 211 will automatically start as soon as a viewing device is started or made active. In an embodiment, the user is a viewer among the viewers in the audience. In an embodiment, the App 211 can optionally be automatically started when the device starts. Next, in step 242, App 211 starts image recognition software. Then, in step 243, the App 211 captures viewers' images using the accessible camera (built in, mounted or connected). Next, in step 244, the App 211 determines the number of viewers in the audience, extracts key features of the viewers, and other information such as their emotions and body positions. In an embodiment, the key features include demographic related information, such as height, gender related features, ethnicity related features, age related features, etc.; emotions (i.e., happy, angry, etc.); body position (i.e., lying down, sitting, relaxed sitting, etc.), viewers' relative positions (sitting close or away, etc.). Then, in step 245, the App 211 sends generalized information to Intelligent Personal Recommendation engine 221. In an embodiment, these key features are sent securely to engine 221.

In step 246, the Intelligent Personal Recommendation engine 221 applies an algorithm to find a best profile match for the audience of viewers. In an embodiment, engine 221 will retrieve or create a group profile from database 231 based on the key features received. Next, in step 247, engine 221 applies an algorithm on the key features along with other demographic parameters (e.g., time of the day, start/end/mid of the month, day of the week, sports season, awards such as Oscar, movies, Video on Demand, viewing history, political event, whether related events, breaking news, etc.) to find a recommendation for the audience. Then, in step 248, the engine 221 securely sends the recommendation to the App 211.

Continuing to step 249, App 211 provides content selected by the user, and transmits the selection back to engine 221. During the viewing, App 211 may periodically monitor emotions of the viewers, and provide changes in the emotions to engine 221. Engine 221 may use the changes as feedback concerning the recommendation (e.g., if genre is comedy and user is laughing the reaction will be stored to recommend in future). Finally, in step 249.5, engine 221 stores the user's selection for use as a future recommendation.

Figure 2C:
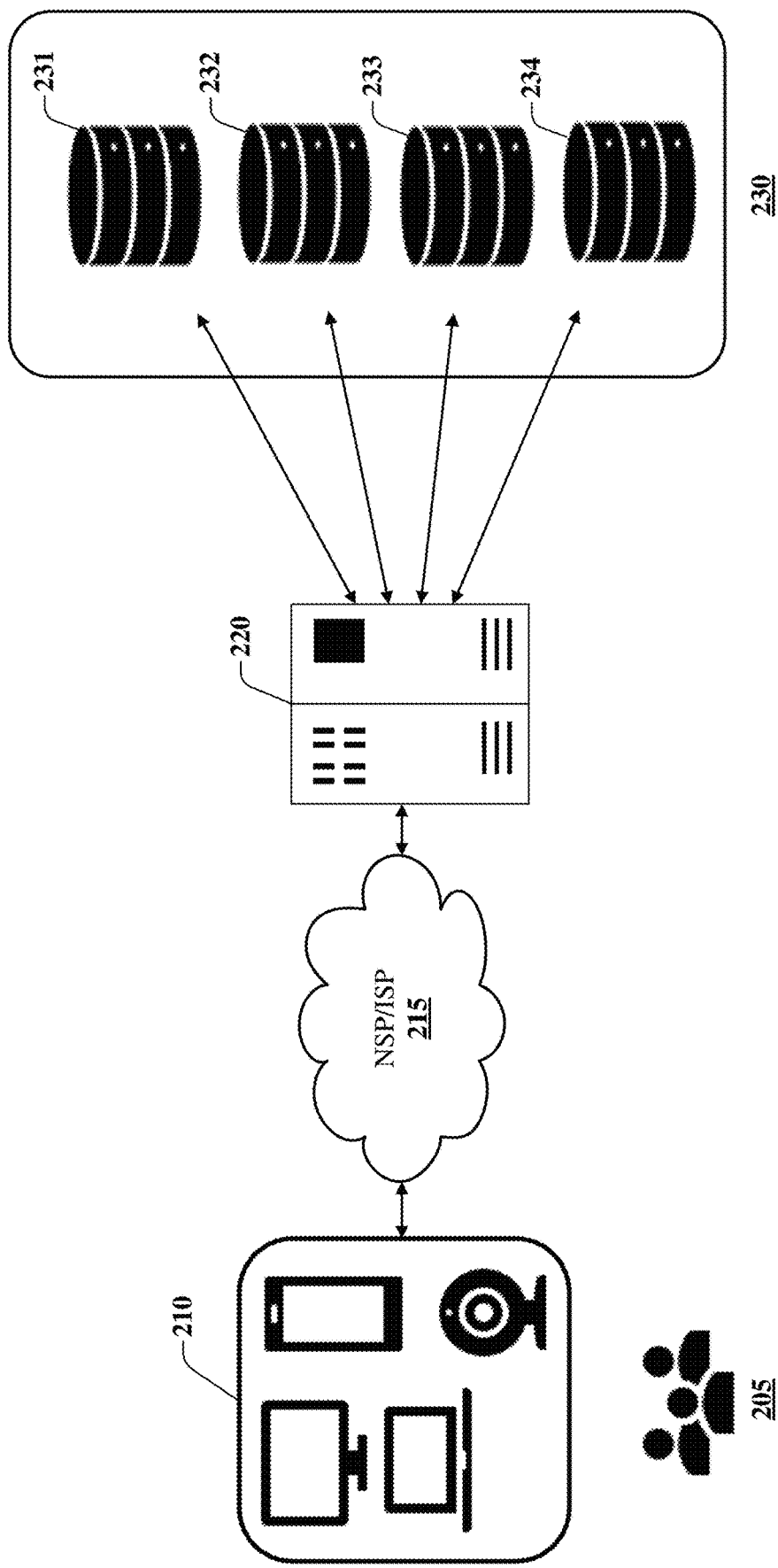
FIG. 2C is a block diagram illustrating an example, non-limiting embodiment of a system for recommending media content based on actual viewers functioning within the communication network of FIG. 1 in accordance with various aspects described herein.

FIG. 2C is a block diagram illustrating in more detail, an example, non-limiting embodiment of a system for recommending media content based on actual viewers functioning within the communication network of FIG. 1 in accordance with various aspects described herein. As shown in FIG. 2C, system 200 comprises one or more user devices 210, a computing system 220, and one or more databases 230, including a profile database 231, an external factors database 232, a viewer feedback/rating database 233, and a historic and market research recommendation database 234.

User devices 210 capture images of individual viewers in an audience 205 using a camera on the customer device. Additional information about each individual viewer of the audience 205 may additionally be obtained. In an embodiment, the user devices 210 includes App 211 described above, which captures the individual viewer's image, for example, when the device or application on the device is started (e.g., TV, Set Top box, etc.) or media content recommendation app on device is started (app on the smart TV, laptop, mobile phone, other hand held devices), when a particular program starts, etc. User devices 210 pass these images and information through a NSP or ISP network 215 to computing system 220.

In an embodiment, computing system 220 comprises Intelligent Personal Recommendation engine 221 described above, which identifies each individual viewer and extracts key attributes of each individual viewer, such as external characteristics, such as gender, height, age, etc., emotions, body position, and other aforementioned characteristics. Such key attributes may be obtained using facial and body analysis. If each individual viewer is not identifiable, generic characteristics will be utilized to determine the demographic/category of the unidentified viewers. The recommendation criteria will give more weight to identified viewers by deriving the recommendation for identified viewers first, and then refining the recommendation using the available viewing history of identified users with the groups of viewers similar to the unidentified viewers. In case such a viewing history is not available, recommendations will be refined using the available viewing data of groups of viewers similar to the identified viewers with the group of viewers similar to unidentified viewers.

Computing system 220 can retrieve and/or update a profile for each individual viewer that is stored in the profile database 231. If the profile is not available, a new profile will be created with the extracted key attributes of the viewers. The recommendation will be based on the data available for the group of viewers similar to the unidentified viewers. Computing system 220 can extract key attributes of individual viewers, such as height, gender related features, ethnicity related features, age related features, etc., using facial and body recognition. The facial and body recognition can be performed by the software on the user devices 210, a media content recommendation app on the user devices 210, or by the computing system 220. In an embodiment, the images/data provided by user devices 210 is exchanged over secured communication channel (e.g., HTTPS with two-way certificates) over NSP or ISP network 215 to computing system 220.

The profile database 231 can store the key attributes of each individual viewer, and other information including the viewer's relationship with other individual viewers, viewing locations, and media content preferences. In an embodiment, the key attributes include characteristics or traits of the individual viewer, such as gender, height, age, etc., and other characteristics derived by image recognition techniques such as facial recognition and body analysis of the viewer's image. In an embodiment, computing system 220 may also create, store, and update a group profile comprising a composite of profiles for the individual viewers, or a composite of key attributes, resulting in group attributes.

The characteristics/traits of the viewers and emotions (e.g. happy, age, etc.) play important role in determining recommendations by computing system 220. The computing system 220 can use the facial, body, and activity analysis, the other characteristics (that changes more dynamically) that can be extracted from the image, such as:

Emotions (Happy, Angry, etc.)
Viewing position (lie down, sitting, relaxed sitting)
Viewers' relative positions (sitting close or away etc.)
Other properties such as cloths, beard, hair color, etc.

For example, if all the users are happy, the recommendations can be different than if some are happy, and some are stressed. These key properties will be available in near real-time to the computing system 220, which can provide a more accurate and relevant recommendation to the audience 205. In another example, if most of the viewers are wearing a Falcon's jersey and drinking beer, then the recommendation can be different than if most of the viewers are wearing Christmas sweaters. In another example, if the market research data shows that the men growing a beard like movies featuring a particular actor, then computing system 220 can use this market research data to recommend movies starring that particular actor to the bearded viewers.

The external factors database 232 stores information not related to the audience, such as the weather condition, sports season, weekend, time of day, and special events, such as elections, etc., that can be used in accordance with the characteristics mentioned above to generate a recommendation of media content for the audience 205. For example, the computing system 220 can recognize that most of the viewers are from south Asia. If the cricket world cup is currently being broadcast, a cricket match involving team(s) from south Asia can be recommended. Further, the recommendations can be different for a week day vs. a weekend.

In an embodiment, computing system 220 evaluates the effect of the media on the viewers using machine-learning based algorithms of the viewers' reactions and genre of the media being watched. Computing system 220 then determines ratings of the media content based on reactions provided by the individual viewers, and stores the ratings for future recommendations a viewer feedback/rating database 233.

As the individual viewers watch the media content, computing system 220 invokes machine-learning algorithm based prediction of media programs/contents for the audience. The prediction can be based on market research, historical data and external factors. Such predictions are stored as recommendations in the historic and market research recommendation database 234. The media contents are recommended for the profile applying machine learning for historical viewing data, preferences of that composite profile, similar composite profiles, individual profiles in that group and similar individuals' profiles, market research data for the similar groups, similar individuals, location and external factors, and media content ratings provided or deduced by composite profile, similar composite profiles, individual profiles in that group and similar individuals' profiles.

The combination of the viewers in the audience can be a key to recommending media contents. For example, if a father and daughter are watching the media contents, recommendations will be drastically different than two adults watching the contents. Even within the same family, a father and young son may watch a different type of media content than father and an elder son. In an embodiment, computing system 220 creates a composite group profile by identifying the viewers in the images and uses external characteristics/traits, emotions, location and other characteristic of the viewers along with external factors to recommend the media for that combination of the viewers.

In an embodiment, the computing system 220 will use the body position of the viewers watching the media content for media content recommendation. For example, if the viewers are leaning back or laying down, the recommendation can be for a different genre of media content than if the viewers are sitting straight and watching. Relative body position of the viewers also plays important role. For example, if two adults are sitting close, then the romantic movies can be recommended.

In an embodiment, computing system 220 determines the physical location of the audience through various means. For example, computing system 220 may capture details of user devices 210, such as media access control (MAC) layer addresses, Internet protocol (IP) addresses, a device identifier, a phone number, a SIM card, a Wi-Fi router to which the device is connected, or GPS coordinates for one or more of the user devices 210. From these details, the computing system 220 can find the location of the user devices 210 using techniques known in the art. For example, When a customer device is started or the media recommendation app is started, the details of the device on which the media is being watched, such as media access control address, IP address, device identifier, phone number, SIM card, or Wi-Fi router/Router/Modem (to which device is connected) or the geo coordinate of the physical location will be captured and sent to the computing system 220. The location can be determined from the NSP, ISP or a geo location service. For example, the NSP has an inventory of devices such as set top box along with the address of the customer and can provide the location of the device. A geo location service can be used to determine the location in case the recommendation application has access to the GPS system on the device and send the geo coordinates to the computing system 220. NSPs can also determine the location of the device from the phone number or SIM card of the devices. The NSP can send the physical location to the computing system 220.

The computing system 220 can use the location information of the viewers to further enhance the recommendation. For example, if the viewers are watching from a Las Vegas hotel, then the recommendations can be more geared towards gambling than if the viewers are watching from Alaska. In another example, if the viewers are watching on a handheld device in the garden, then the recommendations can be light, nature-related media content.

In another embodiment, the physical location can be further refined using the background in the captured images. For example, if an adult man and kids are watching in the family room, the recommendation can be more towards animation movies than for a couple watching in a bedroom. The physical location is of the group viewing the media together in one location. The characteristic of the location will be type of room (e.g. bedroom, dark room) in addition to the type of place (e.g., home location/vacation location, friend's house, apartment/community club house, etc.

In another embodiment, viewers preferences may be different when the viewers are watching the media at home (e.g., action movies) than watching the media in the vacation place (vacation/travel related). The preference of the viewers may change when viewers are watching the media in the viewers home (may prefer for pay-per-view videos) than friend house (may prefer for free media). The preference of the viewer may change when watching the media in the basement where viewer may have a projector or home theater (e.g., science fiction movie) than in the family room (e.g., situational comedy).

Figure 2D:
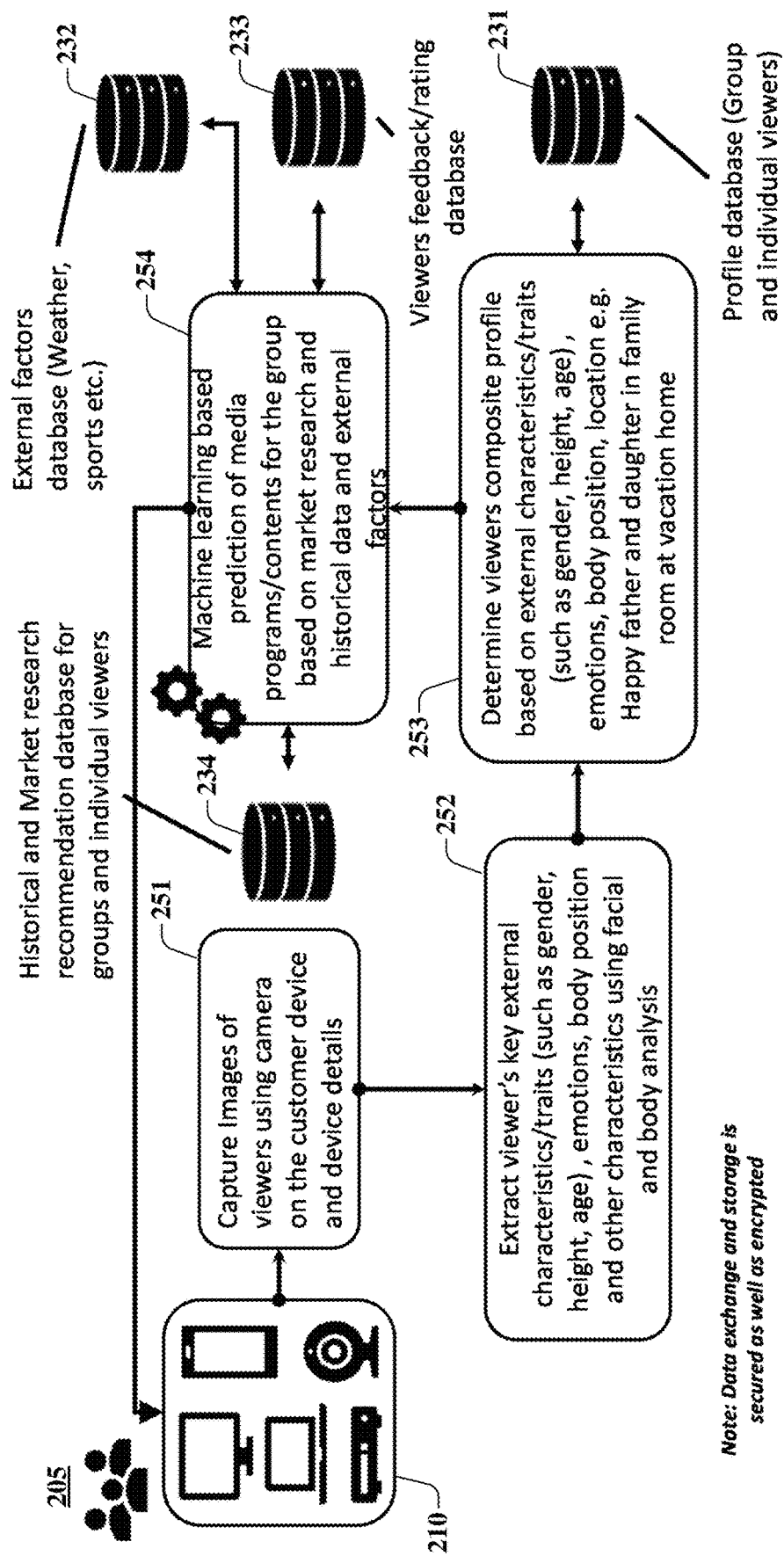
FIG. 2D is a block flow diagram illustrating in more detail, an example, non-limiting embodiment of a system for recommending media content based on actual viewers functioning within the communication network of FIG. 1 in accordance with various aspects described herein.

FIG. 2D is a block flow diagram illustrating in more detail, an example, non-limiting embodiment of a system for recommending media content based on actual viewers functioning within the communication network of FIG. 1 in accordance with various aspects described herein. As shown in FIG. 2D, in step 251 the system captures images of viewers using camera(s) on the customer device 210. The system also retrieves device details. In step 252, the system extracts viewers' key external characteristics/traits. In step 253, the system determines viewers' composite profile based on their key external characteristics/traits. Finally, in step 254, the system performs a machine-learning based prediction of media contents for the audience based on market research, historical data, and external factors.

Figure 2E:
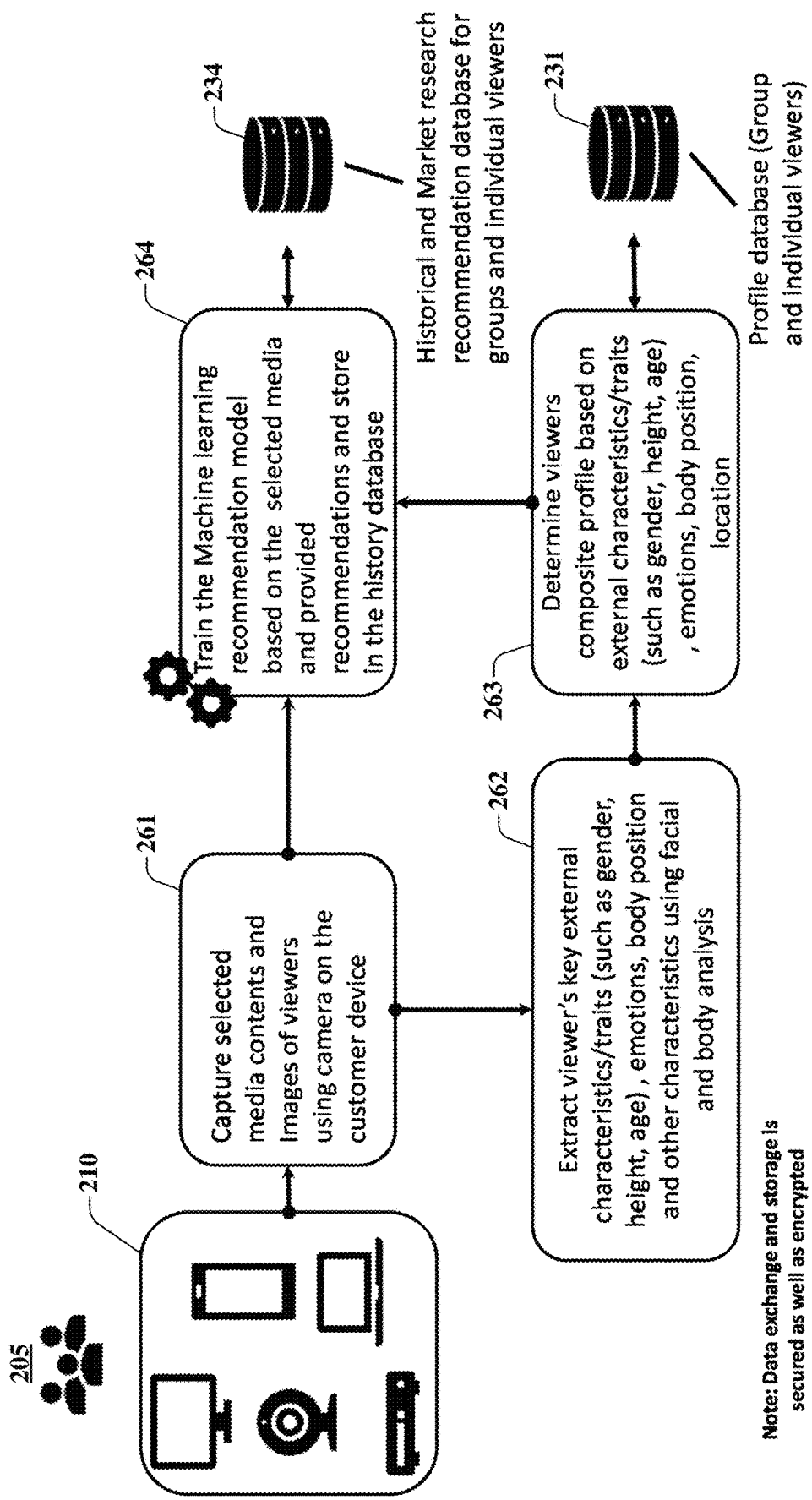
FIG. 2E is a block flow diagram illustrating in more detail, an example, non-limiting embodiment of a system for training a recommendation model functioning within the communication network of FIG. 1 in accordance with various aspects described herein.

FIG. 2E is a block flow diagram illustrating in more detail, an example, non-limiting embodiment of a system for training a recommendation model functioning within the communication network of FIG. 1 in accordance with various aspects described herein. As shown in FIG. 2E, method 260 begins in step 261, where the selected media content and the images of the viewers are captured. Next, in step 262, the system extracts key characteristics of the viewers using facial and body analysis. Next in step 263, the system determines or create individual profiles and a composite profile for the audience. In an embodiment, the extraction and determination can be made at device level by the customer device 210, at the app level by App 211 (not shown), or by the engine 221 (not shown). The selected media information is stored for that composite profile and individual profiles. Next, in step 264, the selected media content and the recommended media content are used to train the machine learning recommendation model.

Figure 2F:
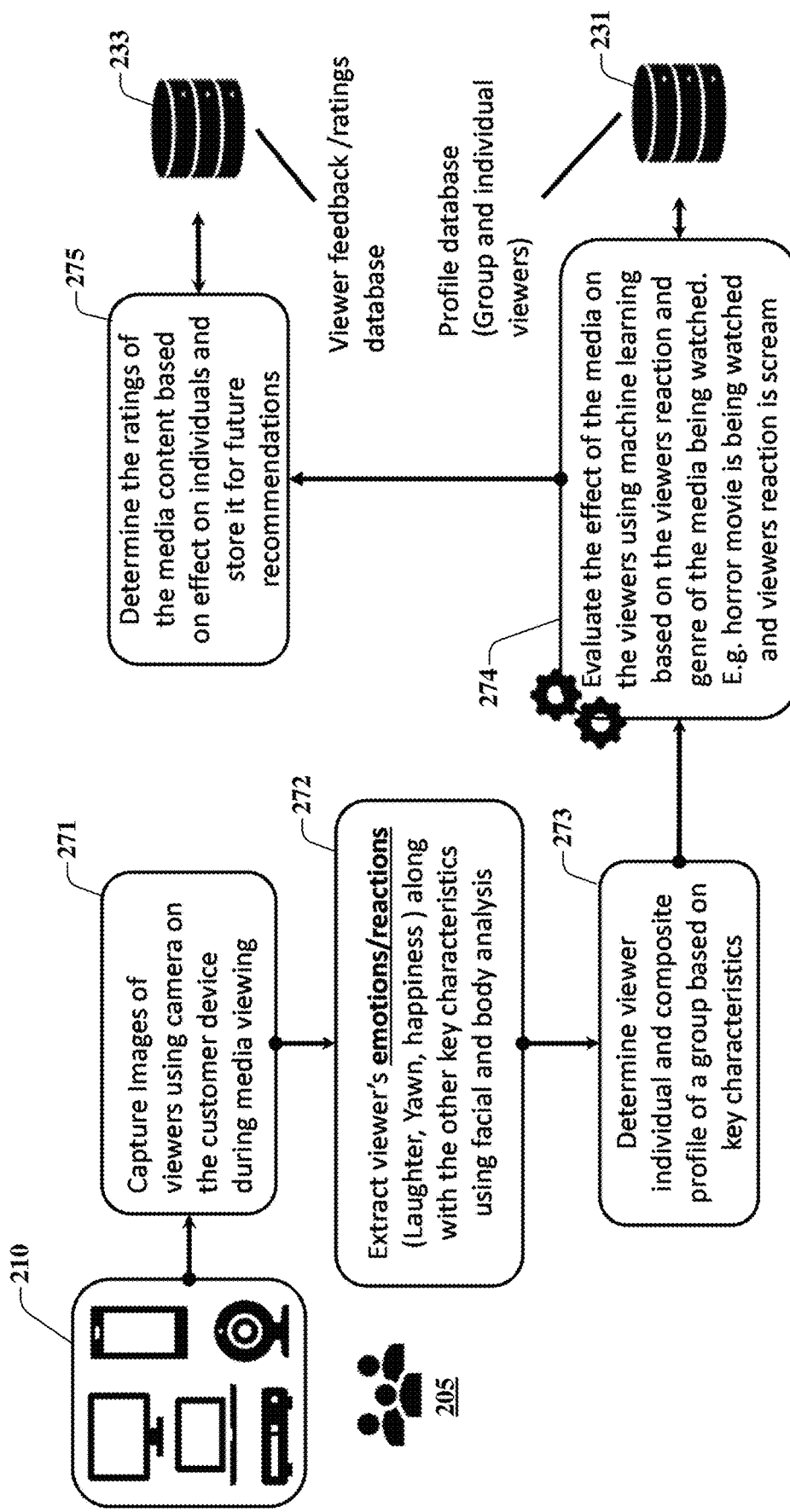
FIG. 2F is a block flow diagram illustrating in more detail, an example, non-limiting embodiment of a system for correlating emotions of the individual viewers in the audience to rate the media content viewed functioning within the communication network of FIG. 1 in accordance with various aspects described herein.

FIG. 2F is a block flow diagram illustrating in more detail, an example, non-limiting embodiment of a system for correlating emotions of the individual viewers in the audience to rate the media content viewed functioning within the communication network of FIG. 1 in accordance with various aspects described herein. As shown in FIG. 2F, method 270 begins in step 271, where the system captures images of viewers using camera(s) on the customer device 210. In step 272, the system extracts viewers' emotions and or reactions and other key characteristics, using facial and body analysis. While viewers are watching or selecting the media contents images can be captured continuously and viewers' reaction or emotions are extracted. In step 273, the system determines viewers' individual and a composite profile based on the viewers' key characteristics. The key characteristics (such as height, gender related features, ethnicity related features, age related features, etc.), to identify the individual viewers in the group, are extracted. The composite and the individual profiles for viewers is determined or created based on these properties.

Next, in step 274, the system evaluates the effect of the media on the viewers using a machine learning algorithm based on the viewers' reaction and the genre of the media content viewed. The reactions and emotions of the viewers are extracted from the captured images and correlated with the genre of media content that is being watched to determine the effect. E.g., the dullness during the thriller movie will be consider the negative effect, excitement for the thriller movie will be consider positive effect, laughter's during comedy movie is consider as the effect reaction whereas stress will be considered as the negative effect.

Last, in step 275, the system will determine ratings of the media content based on the effect the media content has on the viewers and stores the ratings for future recommendations. The rating is determined for the individual viewers and group of the viewers and saved in the database against the individual profiles and the composite profile. This feedback/rating is used for future recommendation and training the machine learning recommendation model to improve correctness and relevance of future recommendations.

Figure 2G:
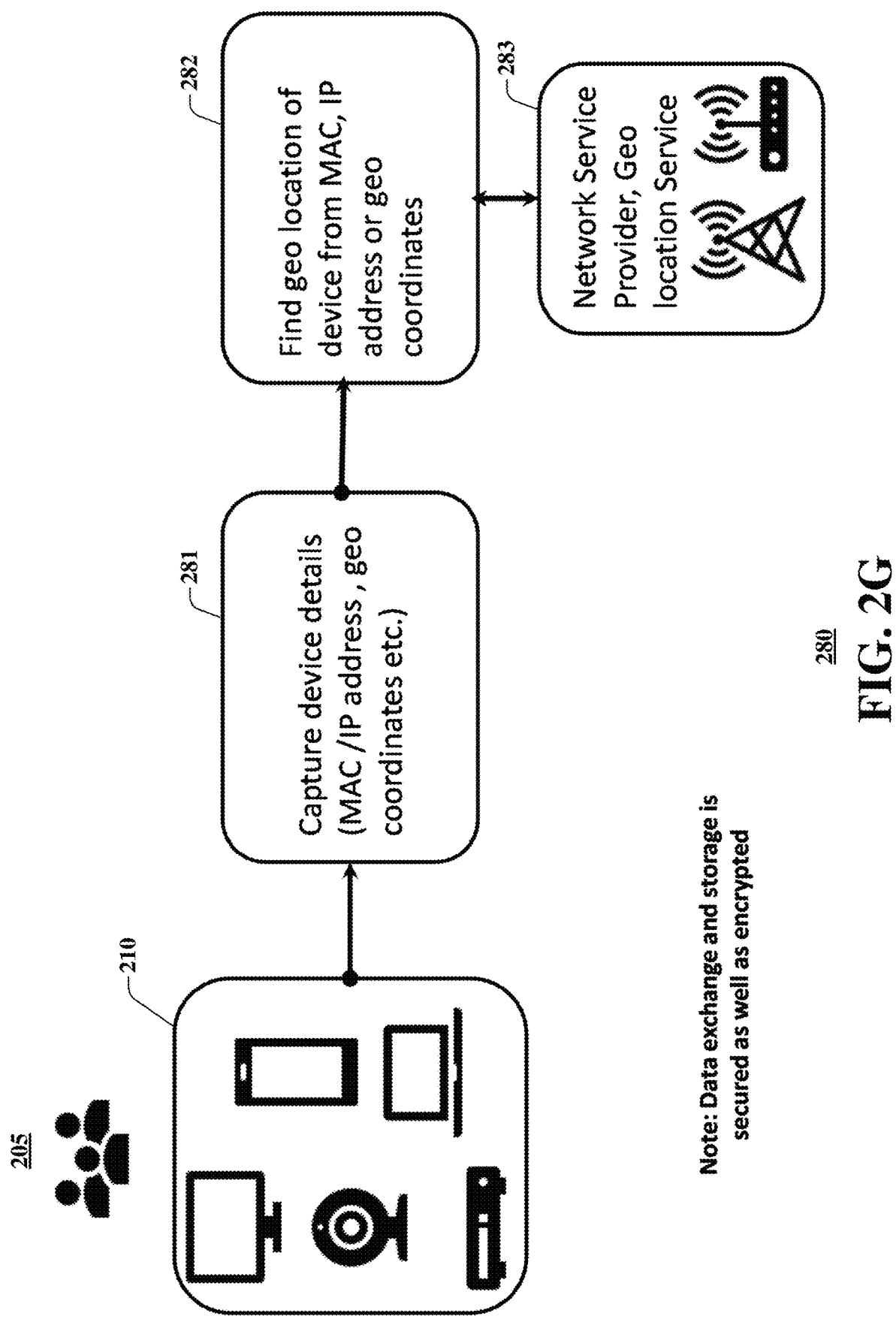
FIG. 2G is a block flow diagram illustrating in more detail, an example, non-limiting embodiment of a system for determining the location of the group of viewers functioning within the communication network of FIG. 1 in accordance with various aspects described herein.

FIG. 2G is a block flow diagram illustrating in more detail, an example, non-limiting embodiment of a system for determining the location of the group of viewers functioning within the communication network of FIG. 1 in accordance with various aspects described herein. As shown in FIG. 2G, in step 281, when the device is started or the media recommendation App 211 is started, information of the device on which the media is being watched such as MAC address, IP address, Device id, phone number, SIM card, Wi-Fi router/Router/Modem (to which device is connected) or the geo coordinate of the locations of the device 210 will be captured and sent to the system. In step 282, the system determines the geo location of the device from the MAC address, and IP address, or from geo coordinates captured by the device. In step 283, the location can be determined from the network service provider or geo location service. A network service provider inventory devices such as set top box along with the address of the customer and can provide the location of the device. Network service providers can also determine the location of the device from the phone number or SIM of the devices and can be obtained by recommendation system. A geo location service can be used to determine the location in case the recommendation application has access to the GPS system on the device and sends the geo coordinates.

Figure 2H:
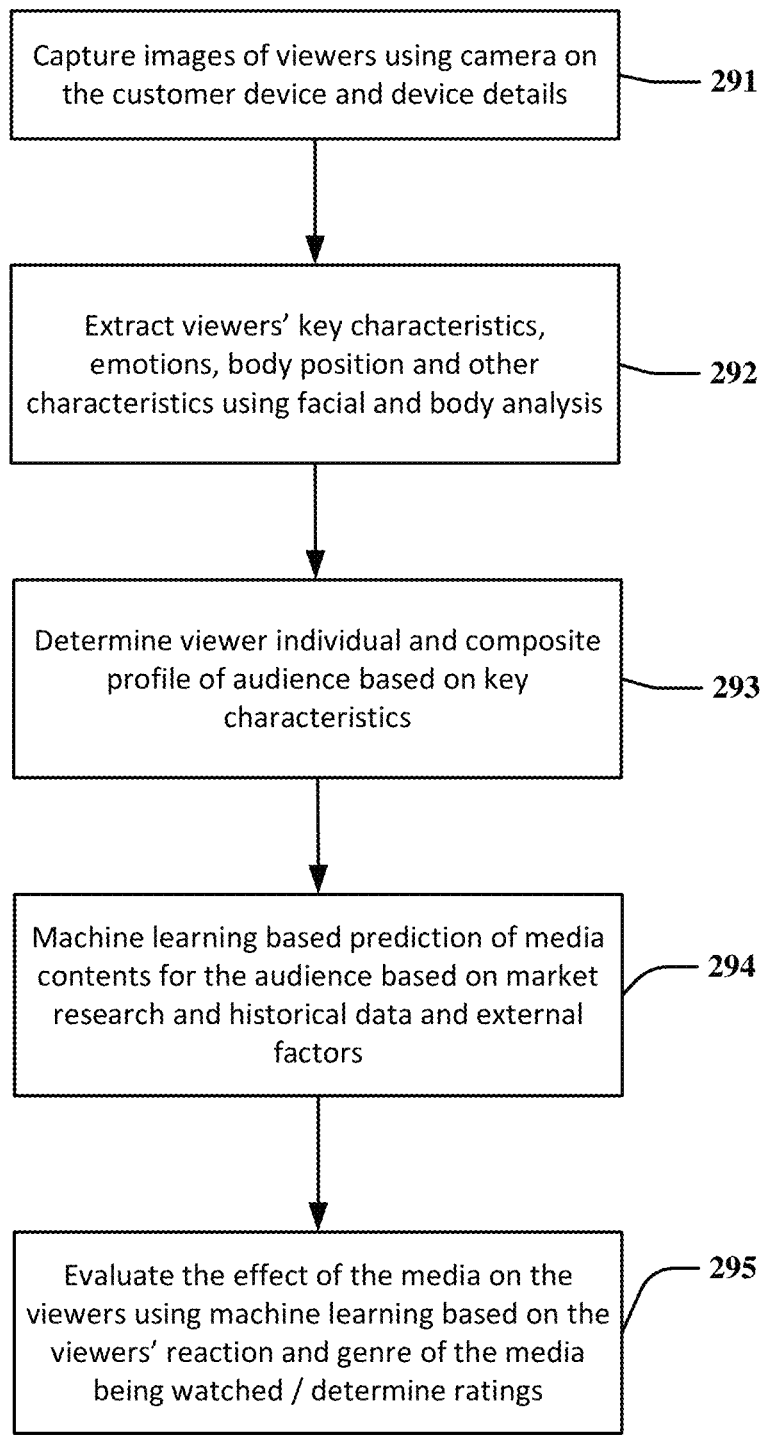
FIG. 2H depicts an illustrative embodiment of a method for providing a media content recommendation in accordance with various aspects described herein.

FIG. 2H depicts an illustrative embodiment of a method for providing a media content recommendation in accordance with various aspects described herein. As shown in FIG. 2H, the method 290 begins at step 291, where the system captures images of viewers using a camera on the customer device, and retrieves information including device details.

Next, in step 292, the system extracts the viewers' key characteristics, such as their identities, their emotions, body position, and other characteristics using facial image recognition and body analysis.

Then, in step 293, the system retrieves profiles for each individual viewer, and for the composite group of viewers in the audience. The system can create a composite profile of the group based on key characteristics of the individual viewers, their relationship with each other, etc.

Next, in step 294, the system executes machine-learning based algorithms to predict media contents the audience would prefer. The system uses market research and historical data, in combination with external factors, to formulate a recommendation of media content for the audience.

Finally, in step 295, the system evaluates the effect of the media on the viewers in the audience. In an embodiment, the system uses a machine-learning algorithm that is based on the viewers' reaction, and correlates the reaction with the genre of the media content displayed to determine ratings for the media contents that can be used for future recommendations.

While for purposes of simplicity of explanation, the respective processes are shown and described as a series of blocks in FIGS. 2B, 2D, 2E, 2F, 2G and 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 240 presented in FIGS. 1, 2A, 2B, 2C, 2D, 2E, 2F, 2G and 2H and 3. For example, virtualized communication network 300 can facilitate in whole or in part user devices 210, NSP or ISP network 215, computing system 220, or provide cloud storage for one or more databases 230, including profile database 231, external factors database 232, viewer feedback/rating database 233, and historic and market research recommendation database 234. Virtualized communication network 300 can facilitate determining a recommendation for viewing a candidate media content and providing the recommendation to the user equipment for the audience.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part computing system 220 and/or one or more databases 230, including profile database 231, external factors database 232, viewer feedback/rating database 233, and historic and market research recommendation database 234. Computing environment 400 can facilitate determining a recommendation for viewing a candidate media content and providing the recommendation to the user equipment for the audience.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed processing environments where certain tasks are performed by remote processing devices that are linked through a communications network. In a distributed processing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part user devices 210. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part user devices 210, computing system 220, and/or one or more databases 230, including profile database 231, external factors database 232, viewer feedback/rating database 233, and historic and market research recommendation database 234.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed processing environments where tasks are performed by remote processing devices that are linked through a communications network; however, some if not all aspects of the subject disclosure can be practiced on stand-alone computers. In a distributed processing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and
a memory that stores executable instructions that, when executed by the processing system, facilitate performance of operations, the operations comprising:
receiving authorization for capturing images of viewers in an audience of user display equipment over a time period;
identifying a subset of the viewers from analysis of the images resulting in image-identified viewers, wherein a remainder of the viewers are not identified from the analysis of the images resulting in unidentified viewers;
extracting key features of the viewers from the images;
creating individual profiles of the image-identified viewers in the audience and a group profile from the key features, wherein the key features include gender, ethnicity, age and an emotional trait of each image-identified viewer;
executing a machine-learning algorithm to predict, based on the key features stored in the group profile, media content that the audience would prefer resulting in a recommendation, wherein the machine-learning algorithm uses market research and historic data to predict the media content, and wherein the recommendation is derived based on the image-identified viewers and not based on the unidentified viewers;
continuing executing the machine-learning algorithm to refine the recommendation into a revised recommendation for a candidate media content using available viewing history of the image-identified viewers who have similar key features to the unidentified viewers in the audience;
providing the candidate media content to the user display equipment for the audience to view;
monitoring emotions of the viewers utilizing an image processing technique while the audience is viewing the candidate media content;
providing changes in the emotions of the audience, preferences of similar individuals' profiles to the individual profiles, and preferences of similar composite profiles to the group profile as feedback that trains the machine-learning algorithm concerning the candidate media content;
determining ratings of the candidate media content based on an effect that the candidate media content has on the audience; and
storing the ratings in a database for the group profile.
2. The device of claim 1, wherein the operations further comprise determining a number of viewers in the audience.

3. The device of claim 1, wherein the key features include other traits including clothing, a body position, reactions to the media content, or a combination thereof.

4. The device of claim 3, wherein the other traits include a relative position of each individual to a display device of the user display equipment.

5. The device of claim 4, wherein the machine-learning algorithm additionally uses a factor external to the audience to predict the candidate media content.

6. The device of claim 5, wherein the factor comprises a time of day, a weather condition, a sports season, or a combination thereof.

7. The device of claim 1, wherein the candidate media content is further determined based on a physical location of the audience, wherein the physical location is determined using a background in the images.

8. The device of claim 7, wherein the physical location of the audience is determined from a media access control address, an IP address, a device identifier, a phone number, a SIM card, a Wi-Fi router to which the device is connected, GPS coordinates, or a combination thereof.

9. The device of claim 1, wherein the processing system comprises a plurality of processors operating in a distributed processing environment.

10. A non-transitory, machine-readable medium, comprising executable instructions that, when executed by a processing system including a processor, facilitate performance of operations, the operations comprising:

receiving authorization for capturing images including each individual viewer of an audience viewing media content on equipment over a time period;

identifying a subset of the viewers from analysis of the images resulting in image-identified viewers, wherein a remainder of the viewers are not identified from the analysis of the images resulting in unidentified viewers;

identifying one or more key attributes for each individual viewer from the images, resulting in key attributes for the audience;

creating individual profiles of identified viewers in the audience and a profile for the audience based on the key attributes of the audience, wherein the key attributes include gender, ethnicity, age and an emotional trait of each individual viewer;

executing a machine-learning algorithm to predict, based on the key attributes stored in the profile, a media content that the audience would prefer, resulting in a recommendation, wherein the machine-learning algorithm uses market research and historic data to predict the media content;

continuing executing , the machine-learning algorithm to refine the recommendation into a revised recommendation for a candidate media content using available viewing history of the identified viewers who have similar key features to the unidentified viewers in the audience;

providing the candidate media content to the equipment;

monitoring emotions of the viewers utilizing an image processing technique while the audience is viewing the candidate media content;

providing changes in the emotions of the audience, preferences of similar individuals' profiles to the individual profiles, and preferences of similar composite profiles to a group profile as feedback that trains the machine-learning algorithm concerning the candidate media content;

determining ratings of the candidate media content based on an effect that the candidate media content has on the audience; and storing the ratings in a database for the profile of the audience.

11. The non-transitory, machine-readable medium of claim 10, wherein the one or more key attributes comprise a physical trait of an individual viewer of the audience.

12. The non-transitory, machine-readable medium of claim 11, wherein the physical trait is clothing of the individual viewer, a body position of the individual viewer, reactions to the media content, or a combination thereof.

13. The non-transitory, machine-readable medium of claim 10, wherein the candidate media content is determined based on a physical location of the audience.

14. The non-transitory, machine-readable medium of claim 13, wherein the operations further comprise determining the physical location of the audience from a media access control address, an IP address, a device identifier, a phone number, a SIM card, a Wi-Fi router to which the equipment is connected, GPS coordinates, or a combination thereof.

15. The non-transitory, machine-readable medium of claim 10, wherein the processing system comprises a plurality of processors operating in a distributed processing environment.

16. The non-transitory, machine-readable medium of claim 10, wherein the operations further comprise determining a rating for the candidate media content based on reactions obtained from the individual viewers of the audience while viewing the candidate media content, wherein the reactions are used in accordance with a genre of the media content; and storing the rating for the candidate media content.

17. A method, comprising:

receiving, by a processing system including a processor, authorization for capturing images of viewers in an audience;

capturing, by the processing system, images including each individual viewer of the audience viewing media content on user equipment;

identifying, by the processing system, one or more key attributes for each individual viewer from the image;

creating, by the processing system, individual profiles of identified viewers in the audience and a group profile from the key attributes, wherein the key attributes include an emotional trait of each individual viewer;

executing, by the processing system, a machine-learning algorithm to predict based on the key attributes stored in the group profile, a recommendation for viewing a media content that the viewers would prefer, wherein the machine-learning algorithm uses market research and historic data to predict the media content, and wherein the recommendation is derived based on the identified viewers and not based on unidentified viewers;

continuing to execute, by the processing system, the machine-learning algorithm to refine the recommendation into a revised recommendation for a candidate media content using available viewing history of the identified viewers who have similar key features to unidentified viewers in the audience;

providing, by the processing system, the recommendation to the user equipment for the audience;

monitoring, by the processing system, emotions of the viewers utilizing an image processing technique while the audience is viewing the candidate media content;

providing changes in the emotions of the audience, preferences of similar individuals' profiles to the individual profiles, and preferences of similar composite profiles to the group profile, by the processing system, as feedback that trains the machine-learning algorithm concerning the candidate media content;

determining, by the processing system, ratings of the candidate media content based on an effect that the candidate media content has on the audience; and storing, by the processing system, the ratings in a database for the group profile.

18. The method of claim 17, further comprising: determining a physical trait of an individual of the audience by image recognition techniques.

19. The method of claim 18, wherein the physical trait is a clothing of the individual, a body position of the individual, or a combination thereof.

20. The method of claim 19, wherein the machine-learning algorithm additionally uses a factor external to the audience to predict the candidate media content.

* * * * *